(12) United States Patent
Fujimura

(10) Patent No.: US 7,967,092 B2
(45) Date of Patent: Jun. 28, 2011

(54) VEHICLE

(75) Inventor: Katsumi Fujimura, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 807 days.

(21) Appl. No.: 11/944,098

(22) Filed: Nov. 21, 2007

(65) Prior Publication Data

US 2008/0121450 A1    May 29, 2008

(30) Foreign Application Priority Data

Nov. 24, 2006   (JP) .................................. 2006-316459

(51) Int. Cl.
B60K 13/02    (2006.01)

(52) U.S. Cl. .................................. 180/68.3; 123/184.55

(58) Field of Classification Search .................. 180/68.3; 123/184.53, 184.55, 184.61, 441
See application file for complete search history.

(56) References Cited

U.S. PATENT DOCUMENTS

| | | | | |
|---|---|---|---|---|
| 4,543,918 A * | 10/1985 | Ma | ............................ | 123/184.42 |
| 4,759,320 A * | 7/1988 | Fujii et al. | ................. | 123/184.55 |
| 4,890,586 A * | 1/1990 | Fujii et al. | ................. | 123/184.55 |
| 5,495,834 A * | 3/1996 | Rutschmann et al. | ... | 123/184.31 |
| 5,740,770 A * | 4/1998 | Morota | ..................... | 123/184.55 |
| 6,357,410 B1 * | 3/2002 | Rutschmann | ............ | 123/184.21 |
| 6,408,810 B1 * | 6/2002 | Leipelt et al. | ............ | 123/184.55 |
| 6,422,201 B1 * | 7/2002 | Yamada et al. | ................ | 123/336 |
| 6,539,923 B1 * | 4/2003 | Mengoli | ......................... | 123/472 |
| 6,959,934 B2 * | 11/2005 | Rioux et al. | .................. | 180/68.3 |
| 7,210,547 B2 * | 5/2007 | Nojima | ........................... | 180/68.3 |
| 7,287,504 B2 * | 10/2007 | Stuart | ........................ | 123/184.55 |
| 7,353,902 B2 * | 4/2008 | Noda | .............................. | 180/219 |
| 7,357,205 B2 * | 4/2008 | Nishizawa | .................... | 180/68.3 |
| 7,389,758 B2 * | 6/2008 | Yokoi | ........................ | 123/184.55 |
| 7,418,937 B2 * | 9/2008 | Yokoi | ........................ | 123/184.53 |
| 7,533,645 B2 * | 5/2009 | Fujiwara et al. | ........... | 123/184.55 |
| 7,640,909 B2 * | 1/2010 | Sudoh et al. | .............. | 123/184.55 |
| 7,730,865 B2 * | 6/2010 | Yokoi | ........................ | 123/184.55 |
| 7,735,463 B2 * | 6/2010 | Fujimura | .................. | 123/184.55 |
| 2005/0045147 A1 * | 3/2005 | Ishikawa et al. | ............. | 123/336 |
| 2007/0175431 A1 * | 8/2007 | Yokoi | ........................ | 123/184.55 |

FOREIGN PATENT DOCUMENTS

| | | |
|---|---|---|
| JP | 56-002023 | 1/1981 |
| JP | 63-177627 | * 11/1988 |

* cited by examiner

*Primary Examiner* — Hau V Phan
*Assistant Examiner* — Vaughn T Coolman
(74) *Attorney, Agent, or Firm* — Rabin & Berdo, PC

(57) ABSTRACT

A motorcycle without increased size in a direction in which moving funnels move straight. The moving funnels and stationary funnels lead air to an engine. A funnel moving mechanism includes a turning member for movement of the moving funnels, and a motor for driving the turning member. The moving funnels are moved straight in a predetermined direction between separated positions, in which openings of the moving funnels are separated from openings of the stationary funnels, and abutment positions, in which the openings of the moving funnels abut the openings of the stationary funnels. A direction in which the motor and the turning member are arranged intersects a predetermined direction in which the moving funnels are moved.

14 Claims, 16 Drawing Sheets

VEHICLE

RELATED APPLICATIONS

This application claims the benefit of priority under 35 USC 119 of Japanese patent application no. 2006-316459, filed on Nov. 24, 2006, which application is hereby incorporated by reference in its entirety.

BACKGROUND OF THE INVENTION

1. Field of the Invention

The present invention relates to a vehicle, and more particularly to a vehicle having a funnel through which air is led to an intake port of an engine.

2. Description of Related Art

An intake device provided with an intake inertial pipe (funnel), through which air is led to an intake port of an engine, is known. JP-UM-A-56-2023, for example, discloses an intake device for internal combustion engines, comprising an intake inertial pipe including three stationary pipes (stationary funnels) fixed to an intake muffler (case section), three intermediate extension pipes (moving funnels), which slide on outer peripheries of the three stationary pipes, and three extension pipes (moving funnels), which slide on outer peripheries of the intermediate extension pipes, a plate-shaped flange section (funnel holding section), to which the three intermediate extension pipes are fixed, a horn-shaped suction section (funnel holding section), to which the three extension pipes are fixed, a screw shaft (ball screw) for movement of the flange section and the horn-shaped suction section, a screw-shaft drive gear for rotation of the screw shaft, and a DC motor (drive source) for driving the screw-shaft drive gear. As the DC motor drives, the screw shaft is rotated whereby the flange section and the horn-shaped suction section of the intake inertial pipe are moved. The three intermediate extension pipes and the three extension pipes slide on straight extensions of the three stationary pipes to change a length of the intake inertial pipe. The screw shaft extends in a direction in which the intake inertial pipe is changed in length, and a length of the screw shaft is larger than a length of the intake inertial pipe at the maximum. The screw-shaft drive gear is provided integrally at an end of the screw shaft and the DC motor for driving the screw-shaft drive gear is arranged in the vicinity of an extension of the end of the screw shaft.

In JP-UM-A-56-2023, however, the DC motor (drive source) for driving the screw-shaft drive gear is arranged in the vicinity of an extension of the end of the screw shaft, which is larger in length than that in the case where a length of the intake inertial pipe (funnel) becomes maximum, which causes a problem that the intake device is increased in size in a direction in which the intermediate extension pipes (moving funnels) and the extension pipes (moving funnels) of the intake inertial pipe are moved in a straight fashion.

SUMMARY OF THE INVENTION

The invention solves this problem and provides a vehicle that inhibits increased size in a direction in which the moving funnels move straight.

A vehicle according to one aspect of the invention comprises an engine having an intake port. A stationary funnel is provided through which air is led to the intake port. A moving funnel is arranged movably on an intake side of the stationary funnel and cooperates with the stationary funnel to lead air to the intake port. A funnel moving mechanism includes a turning member for movement of the moving funnel, and a drive source for driving the turning member. The moving funnel is moved straight in a predetermined direction between a first position in which an opening of the moving funnel is separated from an opening of the stationary funnel, and a second position in which the opening of the moving funnel abuts the opening of the stationary funnel. A direction in which the drive source and the turning member are arranged intersects a predetermined direction in which the moving funnel is moved.

As described above, a direction in which the drive source and the turning member are arranged intersects a predetermined direction in which the moving funnel is moved. Thereby, increased size in a direction in which the moving funnel is moved straight is inhibited, unlike the case where a drive source is arranged on an extension of a predetermined direction in which the moving funnel is moved straight. Also, the moving funnel is moved straight between a first position in which an opening of the moving funnel is separated from an opening of the stationary funnel, and a second position in which the opening of the moving funnel t abuts the opening of the stationary funnel, whereby flow of air passing through the moving funnel to be drawn into the stationary funnel is straight even when the opening of the moving funnel is separated from the opening of the stationary funnel. Thereby, obstruction of air flow and a decrease in intake efficiency are inhibited.

In one embodiment, a case section is provided in which the stationary funnel, the moving funnel, and the funnel moving mechanism are arranged. An air filter section is provided for purification of air flowing into the case section. The air filter section is arranged on an opposite side to a side of the case section on which the drive source is arranged. The drive source can thereby be arranged in a position distant from the air filter section, so that a space is formed in a region around the air filter section through which air passes. Since flow of air in the region around the air filter section is not obstructed, flow of air into the case section from the air filter section is not obstructed.

In one embodiment, the drive source, the case section, and the air filter section are arranged straight in a longitudinal direction of the vehicle. This prevents vehicle width from becoming too large in a direction perpendicular to a travel direction.

In one embodiment, a duct section is provided to have air flowing into the case section through the air filter section. The air filter section and the duct section are arranged rearwardly of the case section in a travel direction, and the drive source is arranged forwardly of the case section in the travel direction. Thus, even when the air filter section is arranged rearward in the travel direction to make it difficult for air to enter directly thereinto, air can be easily fed since the duct section forms a passage through which air is caused to flow into the case section from rearward in the travel direction.

In one embodiment, intake ducts through which air enters from outside the vehicle are provided laterally of the case section in the travel direction to have air flowing into the duct section. Air passing through the intake ducts to inflow in the travel direction can thereby be made to flow directly into the duct section, so that air flowing into the case section is improved in intake efficiency.

The intake ducts may be provided on both left and right sides of the case section in the travel direction. By providing the intake ducts on left and right sides which are different from a front side on which the drive source is arranged, flow of air into the intake ducts is not obstructed.

In one embodiment, the drive source is arranged outside the case section. With such construction, electric wiring for driving the drive source, or the like, need not be arranged inside the case section. Evaporated gasoline entering the case section, for example, thereby does not deteriorate the electric wiring.

In one embodiment, the drive source includes a drive shaft connected to the funnel moving mechanism, and a hole into which the drive shaft is inserted is provided on a side of the case section on which the drive source is arranged. The drive shaft can thereby be readily arranged inside the case section.

A sealing member may be provided between the drive shaft and the hole. Air mixed with dust, which does not pass through the air filter section, is thus inhibited from flowing into the case section from a gap between the drive shaft and the hole of the case section, and is inhibited from flowing into the engine.

In one embodiment, the drive source includes a drive shaft connected to the turning member and extending in a direction intersecting the predetermined direction in which the moving funnel is moved. Since the drive shaft extends in a direction intersecting the predetermined direction, size is not increased in the predetermined direction in which the moving funnel is moved.

In this case, the turning member may be connected coaxially to the drive shaft so that the turning member is easily turned.

In one embodiment, the stationary and moving funnels are provided in plural. The funnel moving mechanism includes a funnel holding section that holds the moving funnels, and the funnel holding section is moved straight in the predetermined direction whereby the moving funnels are moved straight between the first position and the second position. The funnel holding section and the moving funnels held thereon are thus readily moved straight at a time. Even when a plurality of moving funnels are arranged on the funnel holding section, a construction is not needed in which the moving funnels are moved straight one by one. Thereby, the funnel moving mechanism for straight movement of the moving funnels is not too complex.

The funnel moving mechanism may include a spindle extending straight in a direction in which an air passage through which air from the stationary funnels passes extends, wherein the funnel holding section is moved along the spindle in a direction in which the spindle extends. With such construction, the funnel holding section can be readily moved straight by the spindle, so that the moving funnels can readily be moved straight.

In one embodiment, the spindle and the turning member intersect each other as viewed from laterally of the vehicle. With such construction, it is not necessary to arrange the turning member in a direction in which the spindle extends, so that increased size in the direction in which the spindle extends is inhibited.

The funnel moving mechanism may further include a moving member moving along the spindle in a direction in which the spindle extends, together with the funnel holding section, and the turning member may include a lever member supporting the moving member movably in the direction in which the spindle extends. Rotational motion of the drive source can thereby be converted by the turning member and the spindle into linear motion, in which the moving member is moved straight, so that the moving member can readily be moved straight along the spindle. As the moving member is moved, the funnel holding section is readily moved straight.

In one embodiment, a throttle body is arranged between the intake port of the engine and an opening of the stationary funnel toward the engine. An air passage of the moving funnel, an air passage of the stationary funnel, and an air passage of the throttle body are formed and connected substantially straight. Air flow to the intake port of the engine from the moving funnel and the stationary funnel can thereby be made straight, and obstruction of air flow and decrease in intake efficiency inhibited.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is now described below with reference to the drawings.

Figure 1:
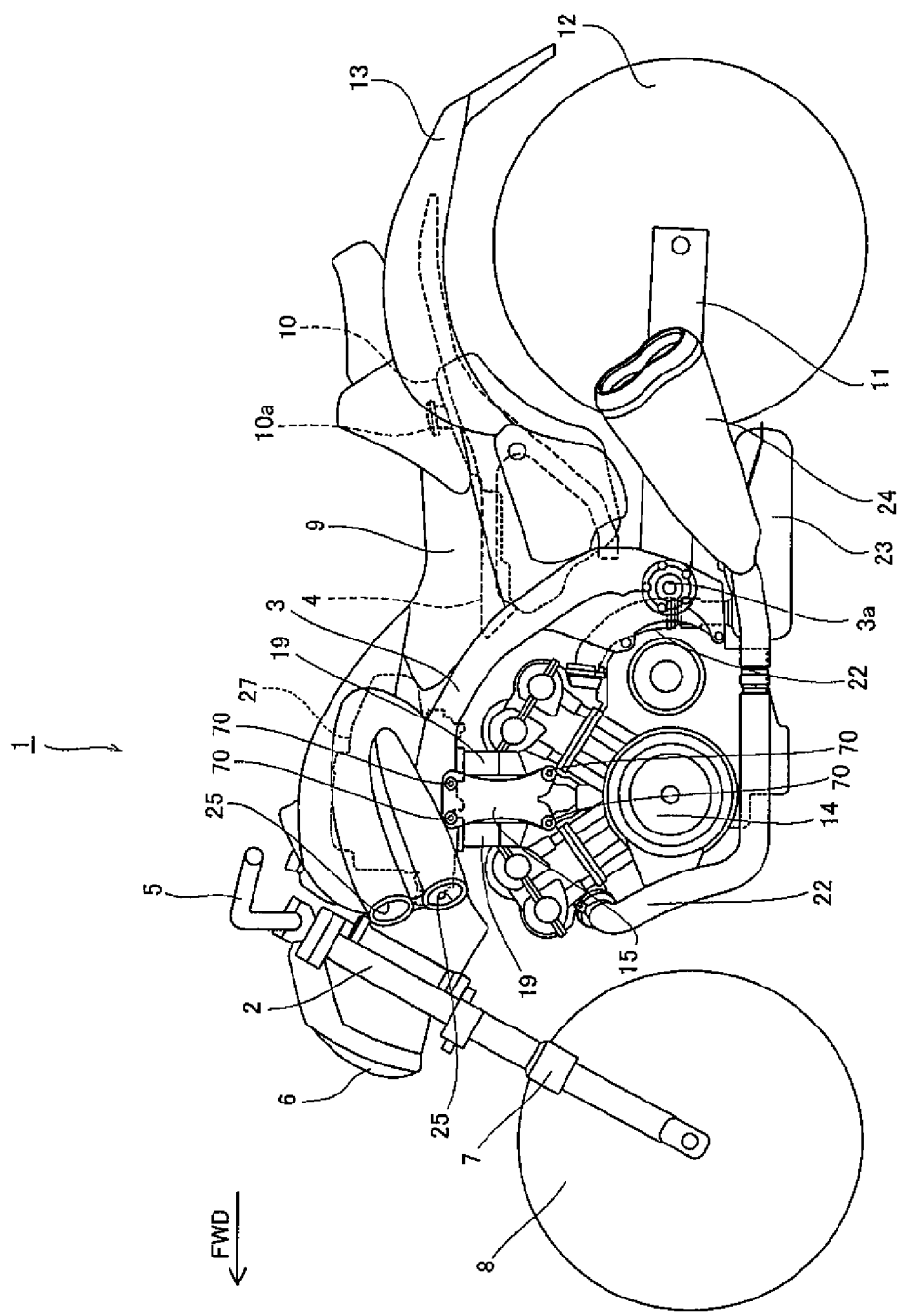
FIG. 1 is a side view of a motorcycle according to an embodiment of the invention.

FIG. 1 is a side view of a motorcycle 1 according to an embodiment of the invention. FIGS. 2-16 illustrate, in detail, a construction of a cleaner box of motorcycle 1. Motorcycle 1 is an example of a vehicle according to the invention. In the drawings, arrow FWD indicates the front in a travel direction of motorcycle 1.

In motorcycle 1, a main frame 3 extending longitudinally is arranged rearwardly of a head pipe 2 as shown in FIG. 1. A rear frame 4 extending rearwardly upward is connected to a rear portion of main frame 3. Head pipe 2, main frame 3, and rear frame 4 constitute a body frame.

A handle 5 is mounted to an upper portion of head pipe 2 to be able to turn. A headlamp 6 is provided forwardly of head pipe 2. A pair of front forks 7 having suspensions for absorbing vertical shock are arranged on a lower portion of head pipe 2. A front wheel 8 is mounted rotatably to lower ends of front forks 7.

A seat 9 is arranged above the rear portion of main frame 3. A fuel tank 10 made of a resin and provided with an oil filler port 10a is arranged below seat 9. A pivot shaft 3a is provided at a rear end (lower portion) of main frame 3. A front end of a rear arm 11 is supported by pivot shaft 3a to be able to swing vertically. A rear wheel 12 is mounted rotatably to a rear end of rear arm 11. Also, a rear fender 13 covers an upper portion of rear wheel 12.

Figure 4:
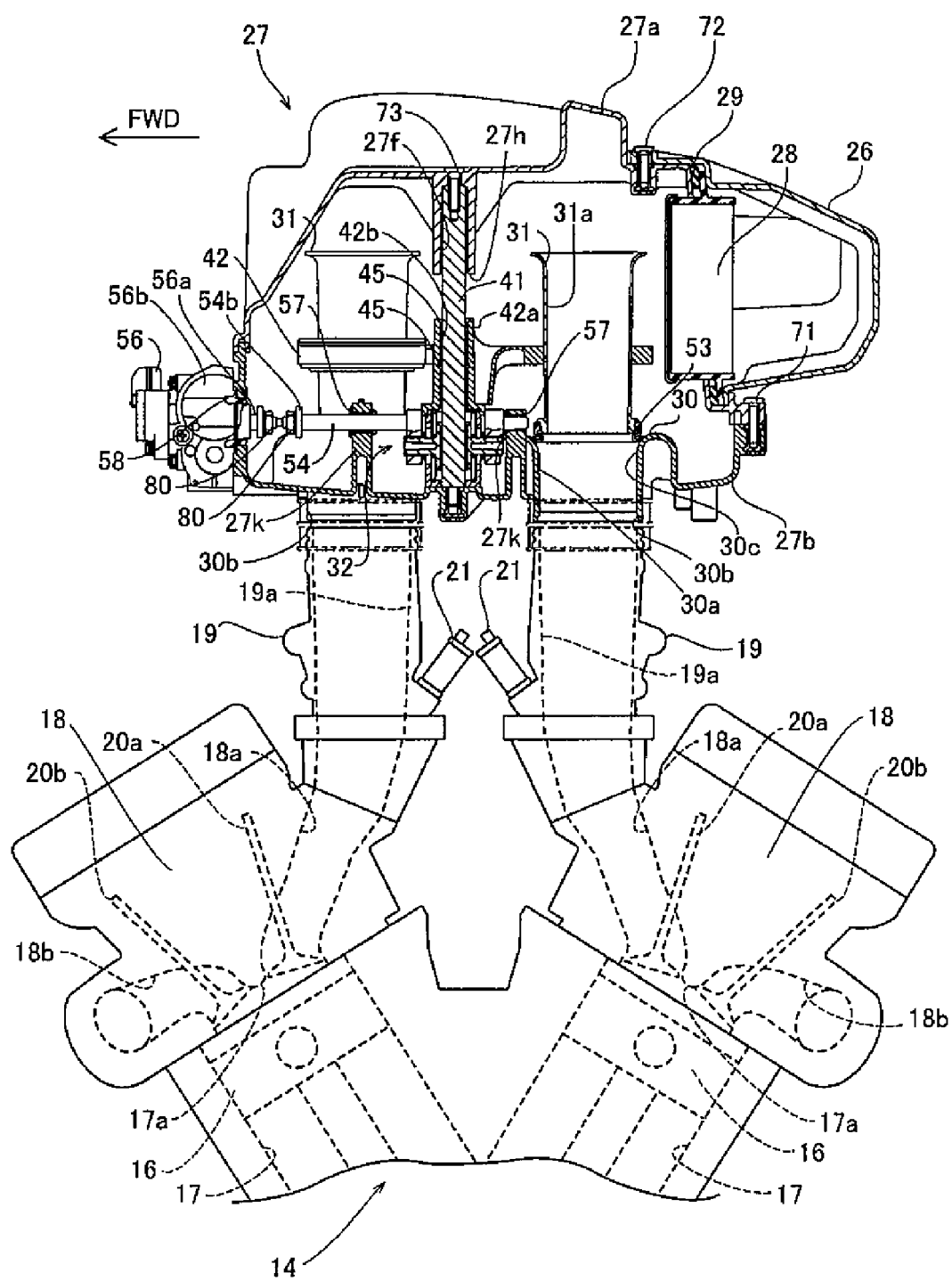
FIG. 4 is a partial, cross sectional view of a neighborhood of the cleaner box of the motorcycle of FIG. 1.

An engine 14 is arranged below and fixed to main frame 3 by a fixation member 15 and screw members 70. Engine 14 comprises, as shown in FIG. 4, pistons 16, cylinders 17, cylinder heads 18, and throttle bodies 19. While only two cylinders 17 are shown in FIG. 4, engine 14 includes four cylinders. Engine 14 is a V-type four-cylinder engine, in which two front cylinders 17 (cylinder heads 18) and two rear cylinders 17 (cylinder heads 18) are arranged to provide a V-shaped space above engine 14. Pistons 16 are arranged in cylinders 17 and cylinder heads 18 are arranged in a manner to close openings of cylinders 17. Cylinder head 18 is formed with an intake port 18a and an exhaust port 18b. Intake port 18a permits a mixture of air and fuel to be supplied to a combustion chamber 17a of cylinder 17. Exhaust port 18b permits discharge of residual gases after combustion from combustion chamber 17a. An intake valve 20a and an exhaust valve 20b are arranged in intake port 18a and exhaust port 18b. Throttle body 19 is mounted to an opening of intake port 18a and an air passage 19a inside throttle body 19 is substantially straight. An injector 21 is mounted to throttle body 19 to jet fuel into intake port 18a. An exhaust pipe 22 is mounted to an opening of exhaust port 18b and a muffler 24 is connected to exhaust pipe 22 through a chamber 23 (see FIG. 1).

Figure 3:
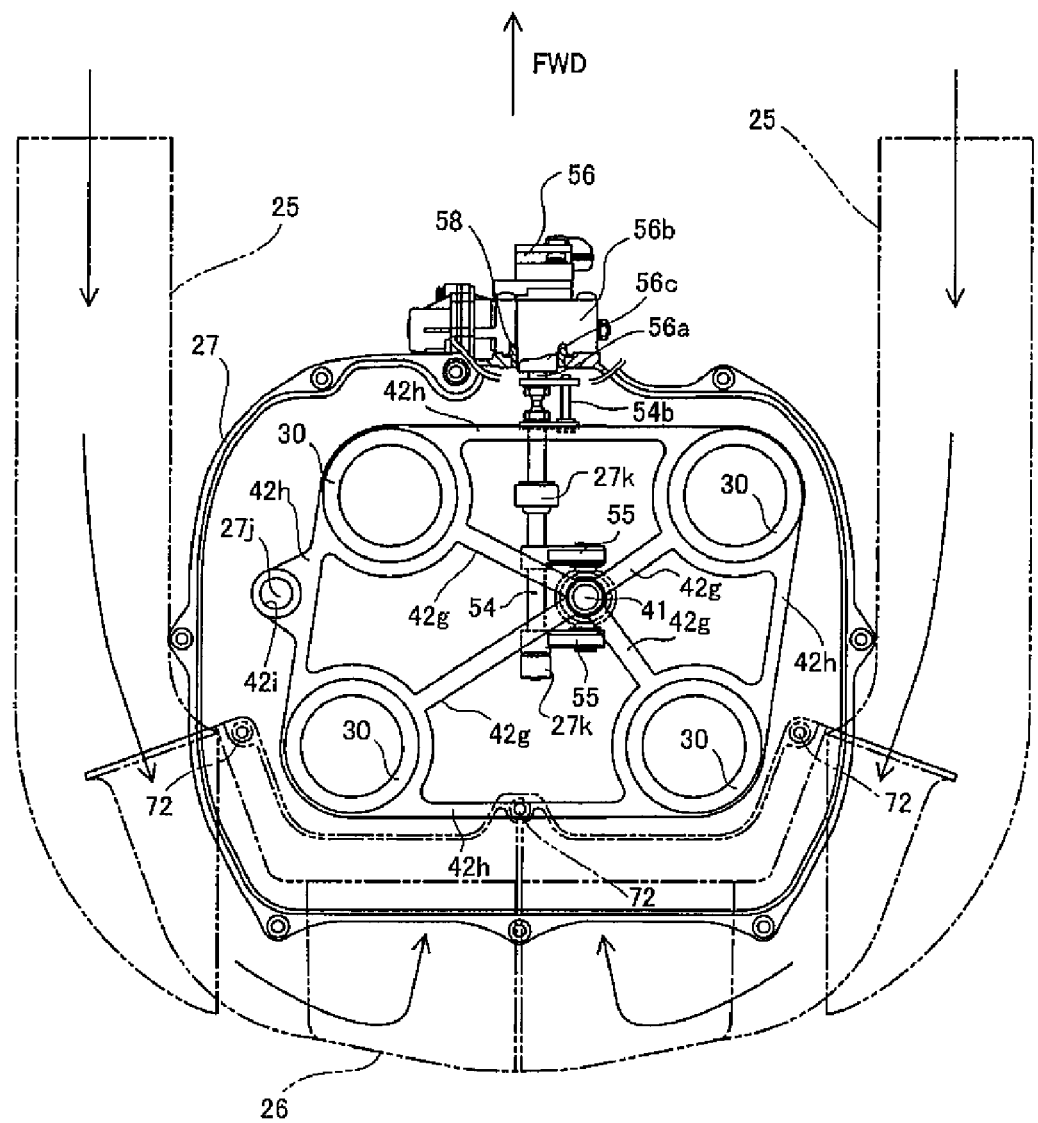
FIG. 3 is a plan view of a neighborhood of the cleaner box of the motorcycle of FIG. 1.

Intake ducts 25 are provided above engine 14 and on both left and right sides of motorcycle 1, as shown in FIGS. 1 and 3. Intake ducts 25 cover left and right portions of a duct section 26. As shown in FIGS. 3 and 4, a cleaner box 27 is arranged between left and right intake ducts 25 to be supplied with air from intake ducts 25. That is, intake ducts 25 are provided on both left and right sides of cleaner box 27 in a travel direction (direction of arrow FWD) and permit air to flow into duct section 26.

Figure 5:
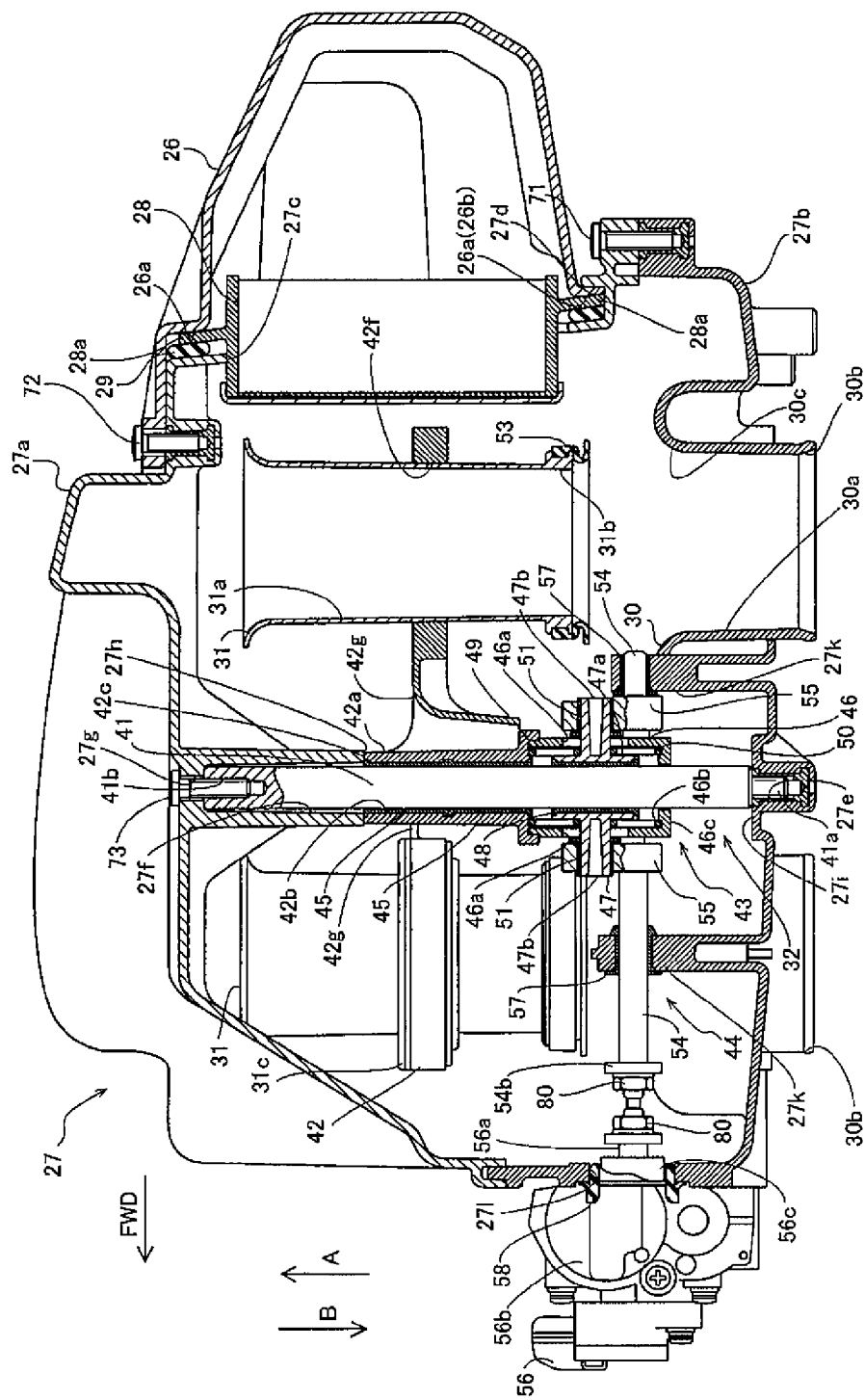
FIG. 5 is a cross sectional view showing a state in which moving funnels of the motorcycle of FIG. 1 are moved to separated positions.

Cleaner box 27 is arranged above the V-shaped space of engine 14 and is an example of a "case section" of the invention. Cleaner box 27 includes an upper cleaner box 27a and a lower cleaner box 27b, as shown in FIG. 5. Upper cleaner box 27a and lower cleaner box 27b are fixed by screw members 71, as shown in FIG. 4.

An air filter section 28 for purification of air supplied from intake ducts 25 covers an opening 27c provided on a rear side of upper cleaner box 27a in the travel direction (direction of arrow FWD) to cover opening 27c. A packing 29 made of sponge is provided between a periphery of opening 27c and a flange portion 28a of air filter section 28. Packing 29 inhibits air from entering and outgoing from a gap between upper cleaner box 27a and flange portion 28a of air filter section 28. A duct section 26 is arranged rearwardly of upper cleaner box 27a and air filter section 28 to cover rear portions of upper cleaner box 27a and air filter section 28. Packing 29 and flange portion 28a of air filter section 28 are interposed between a holding portion 28a of duct section 26 and upper cleaner box 27a. A lower portion 26b of holding portion 26a of duct section 26, together with packing 29 and flange portion 28a, are engaged by an engagement 26d provided on a rear and lower portion of upper cleaner box 27a. An upper portion of duct section 26 is fixed to upper cleaner box 27a by a screw member 72.

As shown in FIG. 3, duct section 26 causes air supplied from intake ducts 25 to inflow in the travel direction (direction of arrow FWD) and leads the inflowed air to a rear portion of cleaner box 27, in which air filter section 28 is arranged. That is, duct section 26 causes air supplied from intake ducts 25 to flow into cleaner box 27 through air filter section 28 from rearward in the travel direction.

Figure 2:
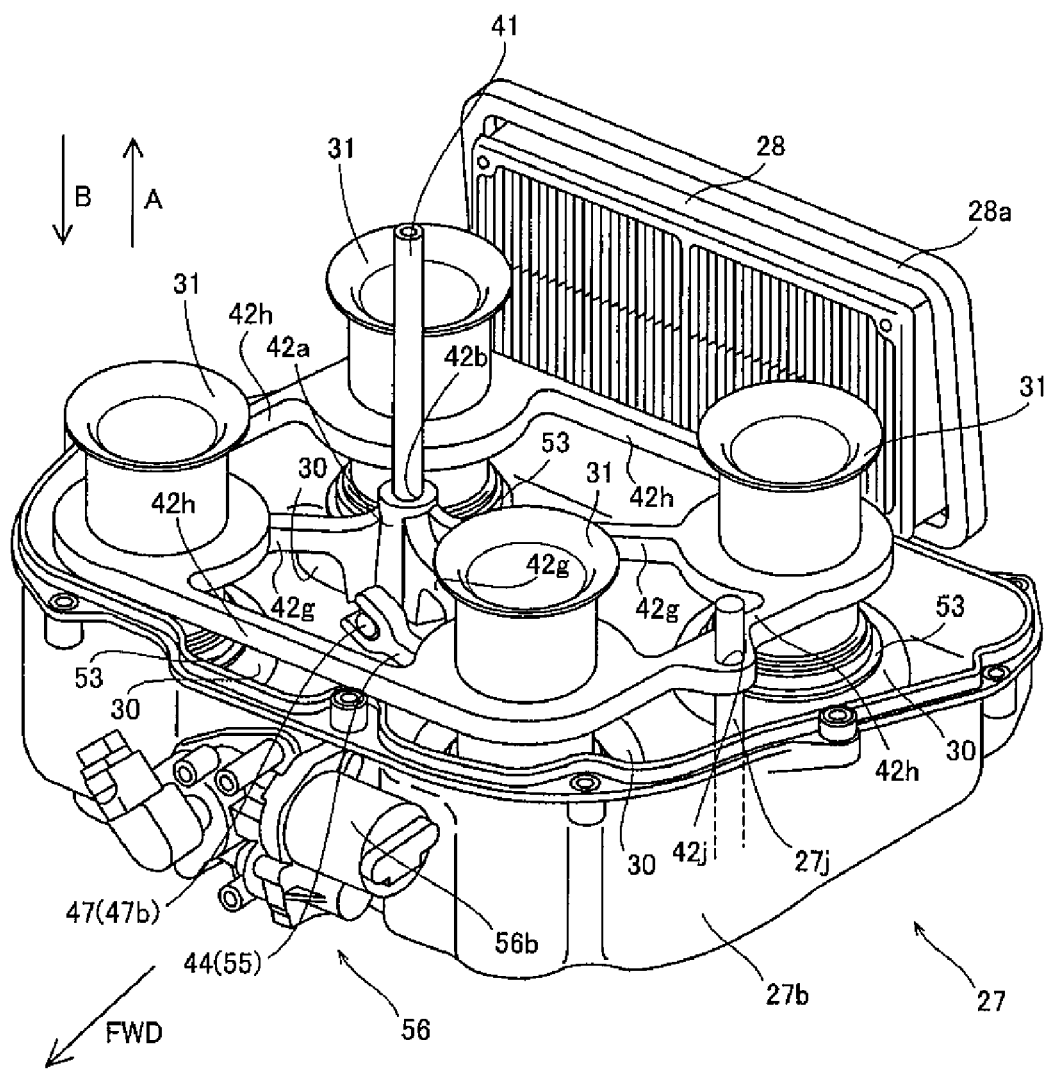
FIG. 2 is a perspective view of a neighborhood of a cleaner box of the motorcycle of FIG. 1.

Also, as shown in FIGS. 2 and 5, stationary funnels 30, moving funnels 31, and a funnel moving mechanism 32 are provided in cleaner box 27. Stationary funnels 30 and moving funnels 31 are provided one by one for each cylinder 17 of engine 14. Stationary funnels 30 are integral with lower cleaner box 27b, as shown in FIG. 5, and air passages 30a inside stationary funnels 30 are substantially straight. Stationary funnels 30 lead air purified in cleaner box 27 to intake ports 18a.

Moving funnels 31 are arranged on an intake side of stationary funnels 30 and air passages 31a inside moving funnels 31 are substantially straight. Moving funnels 31 and stationary funnels 30 lead air purified in cleaner box 27 to intake ports 18a. Lower throttle body connections 30b of stationary funnels 30 positioned outside cleaner box 27 are connected to upper portions of throttle bodies 19. Throttle body connections 30b connect stationary funnels 30 and throttle bodies 19 substantially straight. That is, air passages 31a of moving funnels 31, air passages 30a of stationary funnels 30, and air passages 19a of throttle bodies 19 are formed and connected to be substantially straight.

Figure 6:
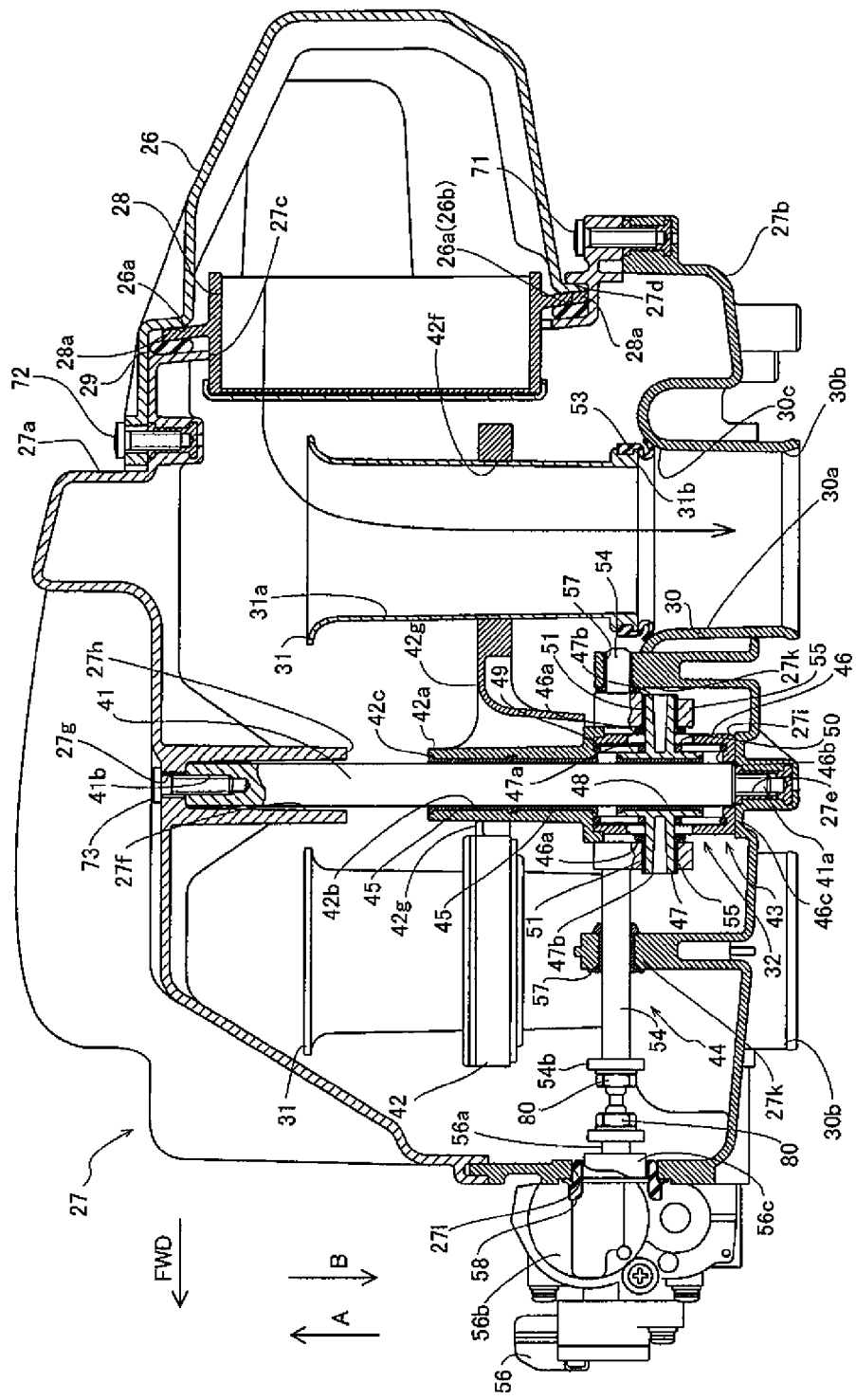
FIG. 6 is a cross sectional view showing a state in which the moving funnels of the motorcycle of FIG. 1 are moved to abutment positions.

As shown in FIGS. 5 and 6, moving funnels 31 are movable between separated positions (a state in FIG. 5), in which openings 31b are separated from openings 30c of stationary funnels 30, and abutment positions (a state in FIG. 6), in which openings 31b of moving funnels 31 abut against openings 30c of stationary funnels 30. When moving funnels 31 are moved to the separated positions (FIG. 5), intake pipes connected to cylinders 17 from cleaner box 27 are constituted by stationary funnels 30, throttle bodies 19, and intake ports 18a. On the other hand, in the case where moving funnels 31 are moved to the abutment positions (FIG. 6), intake pipes connected to cylinders 17 from cleaner box 27 are constituted by moving funnels 31, stationary funnels 30, throttle bodies 19, and intake ports 18a. Funnel moving mechanism 32 moves moving funnels 31 straight between the separated and abutment positions. The separated and abutment positions are examples of a "first position" and a "second position" of the invention.

Figure 7:
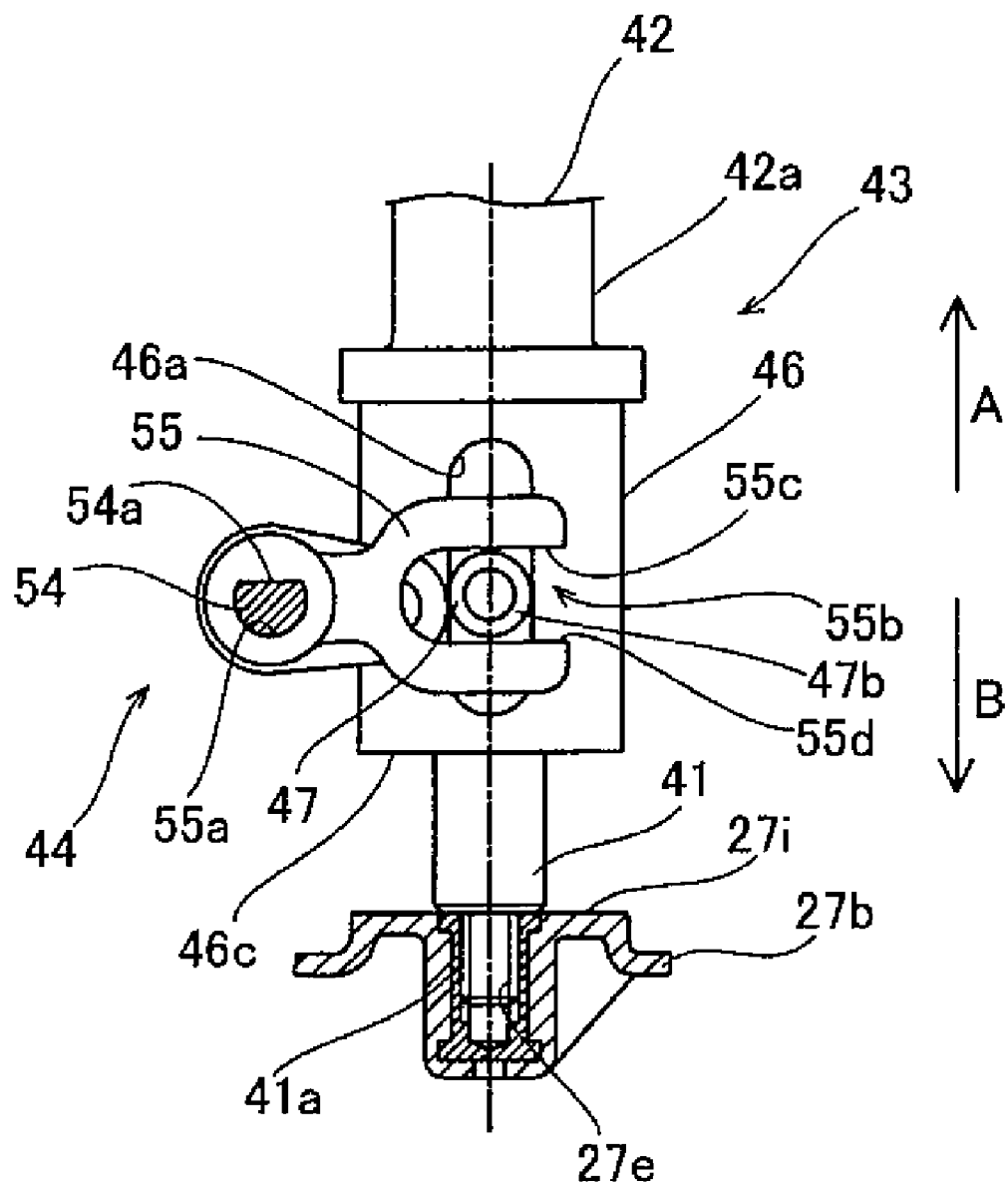
FIG. 7 is a front view showing a state in which lever members of the motorcycle of FIG. 1 are engaged by a moving member.

As shown in FIG. 5, funnel moving mechanism 32 includes a metallic spindle 41 extending straight, a funnel holding section 42 made of a resin to hold moving funnels 31, a moving member 43, and a turning member 44 (see FIG. 7).

Metallic spindle 41 is formed straight in a direction (arrow direction A and arrow direction B) in which air passages 30a, 31a, through which air from stationary funnels 30 and moving funnels 31 passes, extend. Arrow directions A and B are examples of a "predetermined direction" of the invention. A male thread portion 41a is provided on one end side (lower side) of spindle 41 and a female thread portion 41b is provided on the other end side (upper side). Male thread portion 41a is screwed into a threaded portion 27e on an inner bottom surface of lower cleaner box 27b. The other end side (upper side) of spindle 41 is inserted into a shaft inserted portion 27f on an inner, upper surface of upper cleaner box 27a to project inside cleaner box 27 in a cylindrical manner. A screw inserted hole portion 27g is provided on an upper portion of shaft inserted portion 27f to correspond to female thread portion 41b of spindle 41. A screw member 73 is inserted into screw inserted hole portion 27g from outside upper cleaner box 27a and is screwed into female thread portion 41b of spindle 41 inserted into shaft inserted portion 27f.

Funnel holding section 42 moves along spindle 41 in a direction (arrow direction A and arrow direction B), in which spindle 41 extends. A main insertion hole 42b is provided on an inner surface of a cylindrical portion 42a of funnel holding section 42. A bush 45 is fitted into main insertion hole 42b, and an inner peripheral surface of bush 45 is fitted slidably onto the outer peripheral surface of spindle 41. That is, the inner peripheral surface of bush 45 slides on the outer peripheral surface of spindle 41 extending straight, whereby main insertion hole 42b of funnel holding portion 42 and spindle 41 function to move moving funnels 31 held by funnel holding portion 42 straight between separated positions and abutment positions. Also, an upper abutment 42c at an upper end of cylindrical portion 42a of funnel holding section 42 can abut against an upper stopper portion 27h of shaft inserted portion 27f of upper cleaner box 27a to stop funnel holding section 42 at a predetermined level. When upper abutment 42c abuts against upper stopper portion 27h, openings 31b of moving funnels 31 facing stationary funnels 30 are moved to separated positions apart from openings 30c of stationary funnels 30 on the intake (upstream) side.

As shown in FIGS. 5 and 7, moving member 43 is mounted to a lower end 42d (see FIG. 9) of cylindrical portion 42a of funnel holding section 42. Moving member 43 moves along spindle 41 in the direction (arrow direction A and arrow direction B), in which spindle 41 extends, together with funnel holding section 42. Moving member 43 includes, as shown in FIG. 5, a cylindrical-shaped part receiving portion 46 made of a resin and mounted to lower end 42d of cylindrical portion 42a of funnel holding section 42, a slide member 47 made of a resin, a bush 48, an upper spring member 49 composed of a compression spring, and a lower spring member 50 composed of a compression spring. Two cylindrical-shaped projections 47b project in a substantially perpendicular manner from mutually opposite sides of cylindrical-shaped body portion 47a of slide member 47 received in part receiving portion 46. Bushes 51 are fitted onto outer peripheral surfaces of projections 47b. Slots 46a are formed in regions of part receiving portion 46 corresponding to projections 47b and have a predetermined length substantially in parallel to a direction in which slide member 47 moves relative to spindle 41 (arrow directions A and B of FIG. 7).

Slots 46a permit projections 47b to project outside part receiving portion 46 and to move when slide member 47 moves on spindle 41. Bush 48 is fitted onto an inner peripheral surface of body portion 47a of slide member 47, and an inner peripheral surface of bush 48 is fitted slidably onto outer peripheral surface of spindle 41. Lower spring member 50 is fitted onto a portion of body portion 47a of slide member 47 below projections 47b. An upper side of lower spring member 50 abuts against projections 47b and a lower side of lower spring member 50 abuts against a spring bearing portion 46b of part receiving portion 46. Upper spring member 49 is fitted onto a portion of body portion 47a above projections 47b. A lower side of upper spring member 49 abuts against projections 47b and an upper side of lower spring member 50 abuts against a lower surface 42e (see FIG. 9) of cylindrical portion 42a, to which part receiving portion 46 is mounted.

A lower abutment 46c capable of abutting against a lower stopper portion 27i adjacent to threaded portion 27e of lower cleaner box 27b is provided at a lower end of part receiving portion 46 (FIGS. 6 and 7). A distance over which lower abutment 46c travels to abut against lower stopper portion 27i is set to be a little larger than a distance over which openings 31b of moving funnels 31 toward stationary funnels 30 travel to abut against openings 30c of stationary funnels 30. That is, openings 31b of moving funnels 31 abut against openings 30c of stationary funnels 30 before lower abutment 46c abuts against lower stopper portion 27i. The abutment of part receiving portion 46 against lower stopper portion 27i inhibits moving funnels 31 from moving further toward stationary funnels 30 after openings 31b have moved to abutment position against openings 30c.

First connection arm portions 42g are formed in a rod-shaped manner on cylindrical portion 42a surrounding main insertion hole 42b to connect cylindrical portion 42a and funnel mount portions 42f, to which moving funnels 31 are mounted. Second connection arm portions 42h are formed in a rod-shaped manner between respective adjacent funnel mount portions 42f to connect adjacent funnel mount portions 42f (moving funnels 31). Second connection arm portions 42h compensate for stiffness of first connection arm portions 42g.

Figure 8:
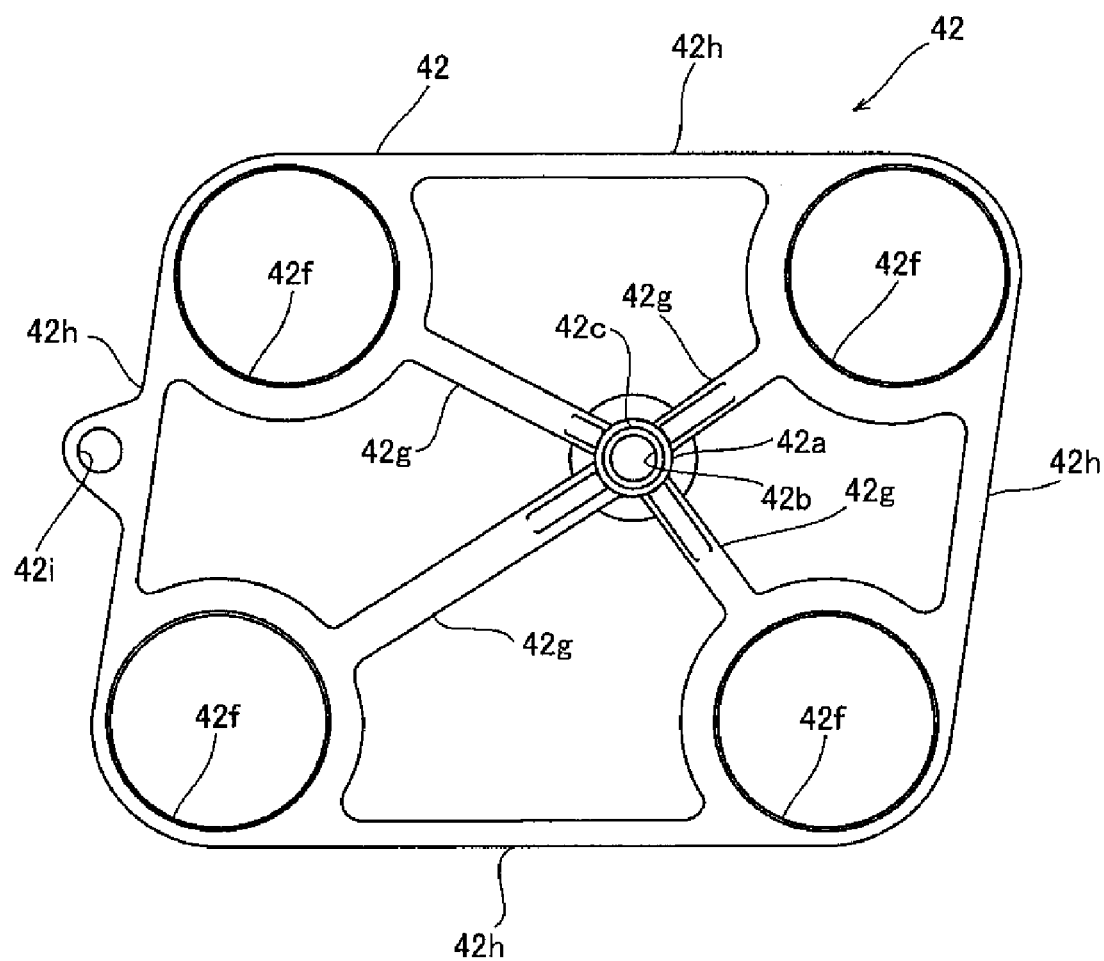
FIG. 8 is a plan view of a funnel holding section of the motorcycle of FIG. 1.

As shown in FIGS. 3 and 8, a sub-insertion hole 42i is formed in the second connection arm portion 42h most distant from spindle 41 (main insertion hole 42b). As shown in FIG. 2, a sub-spindle 27j extending substantially in parallel to spindle 41 is inserted slidably into sub-insertion hole 42i. Sub-spindle 27j is provided integrally on an underside of lower cleaner box 27b. Sub-insertion hole 42i and sub-spindle 27j inhibit funnel holding section 42 and moving funnels 31 from turning about spindle 41 when funnel holding section 42 moves.

Funnel mount portions 42f are circumferential in shape, as shown in FIG. 8. Moving funnels 31 are mounted to funnel mount portions 42f, as shown in FIG. 5.

As shown in FIGS. 5 and 6, rubber lips 53 are mounted to ends of moving funnels 31 adjacent stationary funnels 30. Rubber lips 53 fill gaps between moving funnels 31 and stationary funnels 30 when openings 31b abut against openings 30c.

As shown in FIGS. 5 and 7, a direction in which turning member 44 is arranged intersects (is perpendicular to) a predetermined direction (arrow direction A and arrow direction B) in which moving funnels 31 move. Turning member 44 supports moving member 43 movably in a direction (arrow directions A and B) in which spindle 41 extends. Turning member 44 includes a metallic turning shaft 54 in the form of a round rod and two lever members 55 (see FIG. 7) made of a resin. The round rod and lever members 55 are formed integrally. That is, turning-shaft insertion holes 55a of lever members 55 are mounted to turning shaft 54 by means of insert molding. Flat portions 54a are provided on those portions of turning shaft 54 to which turning-shaft insertion holes 55a are mounted. Flat portions 54a inhibit lever members 55 from idling relative to turning shaft 54 when turning shaft 54 turns.

As shown in FIG. 5, a connection 54b connected to a drive shaft 56a of a motor 56 is provided at one end (front end) of turning shaft 54. A nut 80 is inserted into a threaded portion provided on drive shaft 56a, and a nut 80 is inserted into a threaded portion provided at one end of turning shaft 54, whereby connection 54b is fixed to one ends of drive shaft 56a and turning shaft 54, respectively. Thereby, turning shaft 54 is connected coaxially to drive shaft 56a, so that turning shaft 54 can be rotated as drive shaft 56a rotates. Shaft supports 27k are provided in the vicinity of a substantially intermediate portion between connection 54b and the other end of turning shaft 54 in a manner to project upward from an underside of lower cleaner box 27b. Turning shaft 54 is supported rotatably by bearings 57 fitted into shaft supports 27k.

As shown in FIG. 7, lever members 55 of turning member 44 engage with projections 47b of slide member 47. Specifically, an engagement support 55b of lever member 55 engages slidably with projection 47b and slide surfaces 55c, 55d are provided on engagement support 55b to support projection 47b slidably. Slide surfaces 55c, 55d are provided in the form of a flat surface to face each other. That is, as shown in FIGS. 9-16, when turning member 44 turns to swing lever members 55, projections 47b are supported by and slidable on slide surfaces 55c, 55d. Thereby, turning member 44 can move main insertion hole 42b of funnel holding portion 42 straight along spindle 41.

Motor 56 for driving turning member 44 is arranged in a direction intersecting (perpendicular to) a direction (arrow directions A and B) in which moving funnels 31 move. A body portion 56b of motor 56 is arranged outside a front portion of lower cleaner box 27b. That is, motor 56 is arranged on an opposite side to a side of cleaner box 27 on which air filter section 28 is arranged. Motor 56 is an example of a "drive source" of the invention.

Drive shaft 56a extends in a direction intersecting (perpendicular to) a direction (arrow directions A and B) in which moving funnels 31 move and is arranged inside cleaner box 27. An engagement projection 56c having a drive shaft 56a is provided on motor 56 to be made integral with body portion 56b and fitted through a rubber sealing member 58 into a hole 27l of a front portion of lower cleaner box 27b. That is, drive shaft 56a is inserted into hole 27l. Sealing member 58 fills a gap between hole 27l and engagement projection 56c.

Motor 56 turns drive shaft 56a in a predetermined angular range in one direction or in the other direction. Specifically, motor 56 inhibits drive shaft 56a from turning in one direction when drive shaft 56a turns a predetermined angle in one direction and inhibits drive shaft 56a from turning in the other direction when drive shaft 56a turns a predetermined angle in the other direction.

Figure 13:
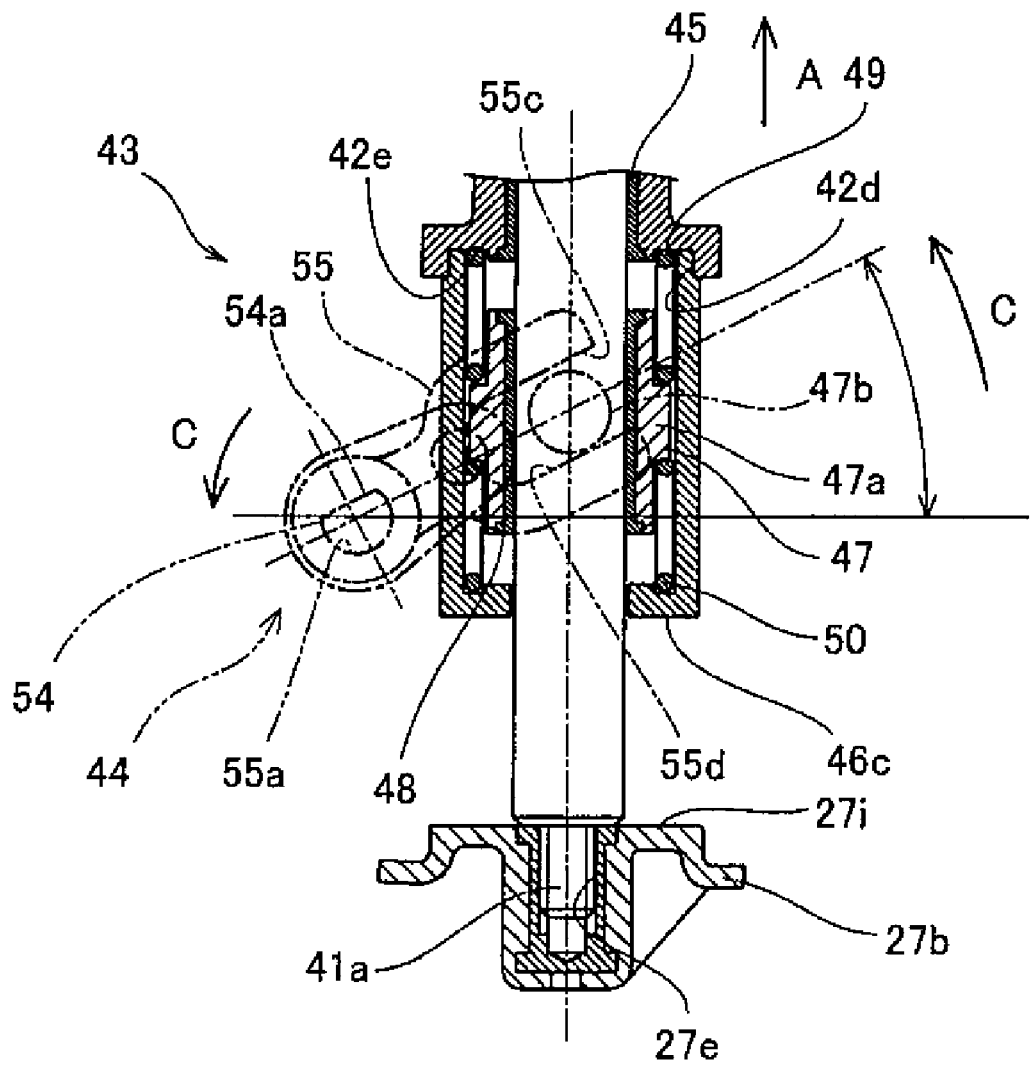
FIG. 13 is a cross sectional view of a moving member of the funnel moving mechanism of FIG. 9.
Figure 14:
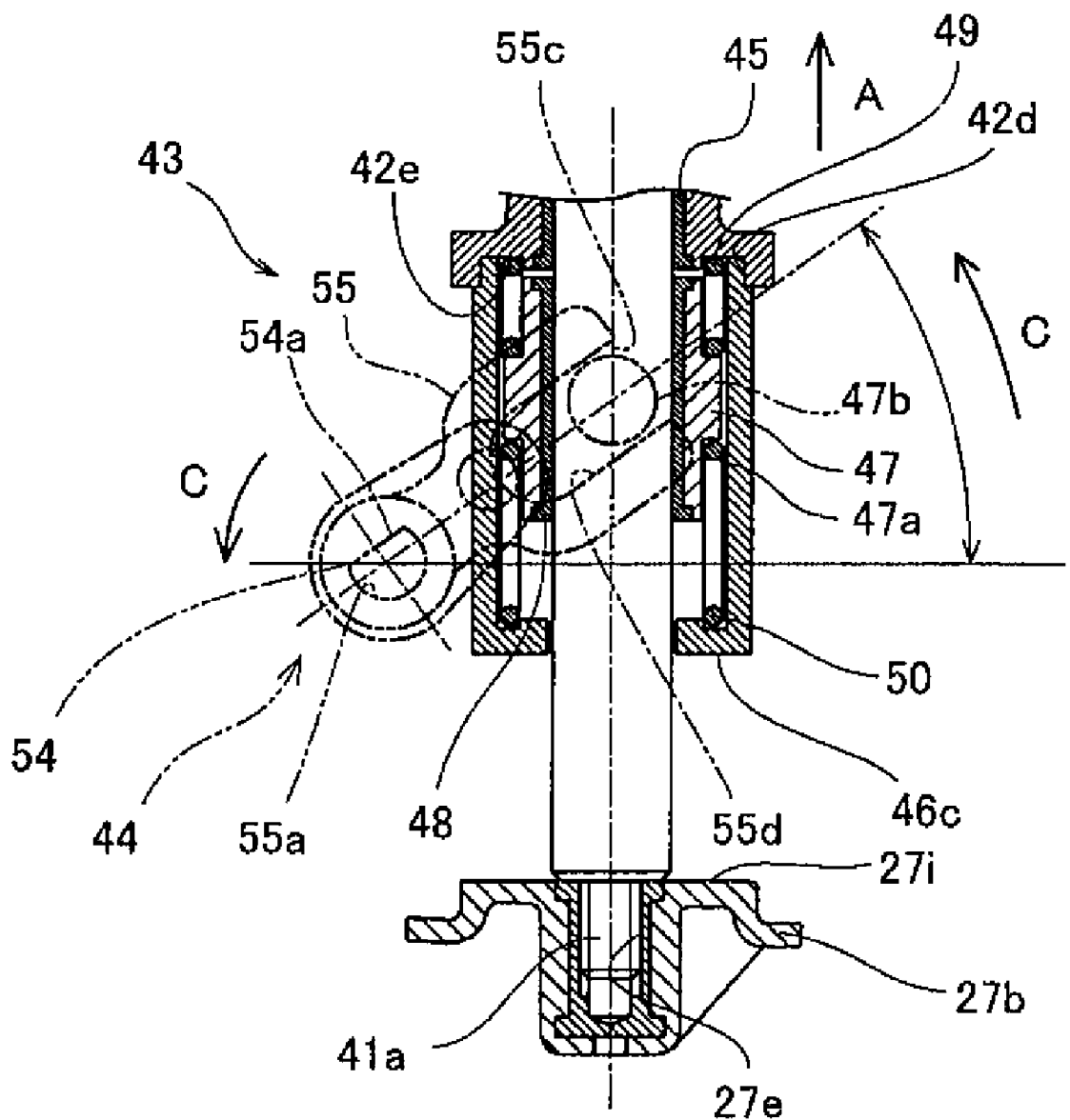
FIG. 14 is a cross sectional view of a moving member of the funnel moving mechanism of FIG. 10.
Figure 15:
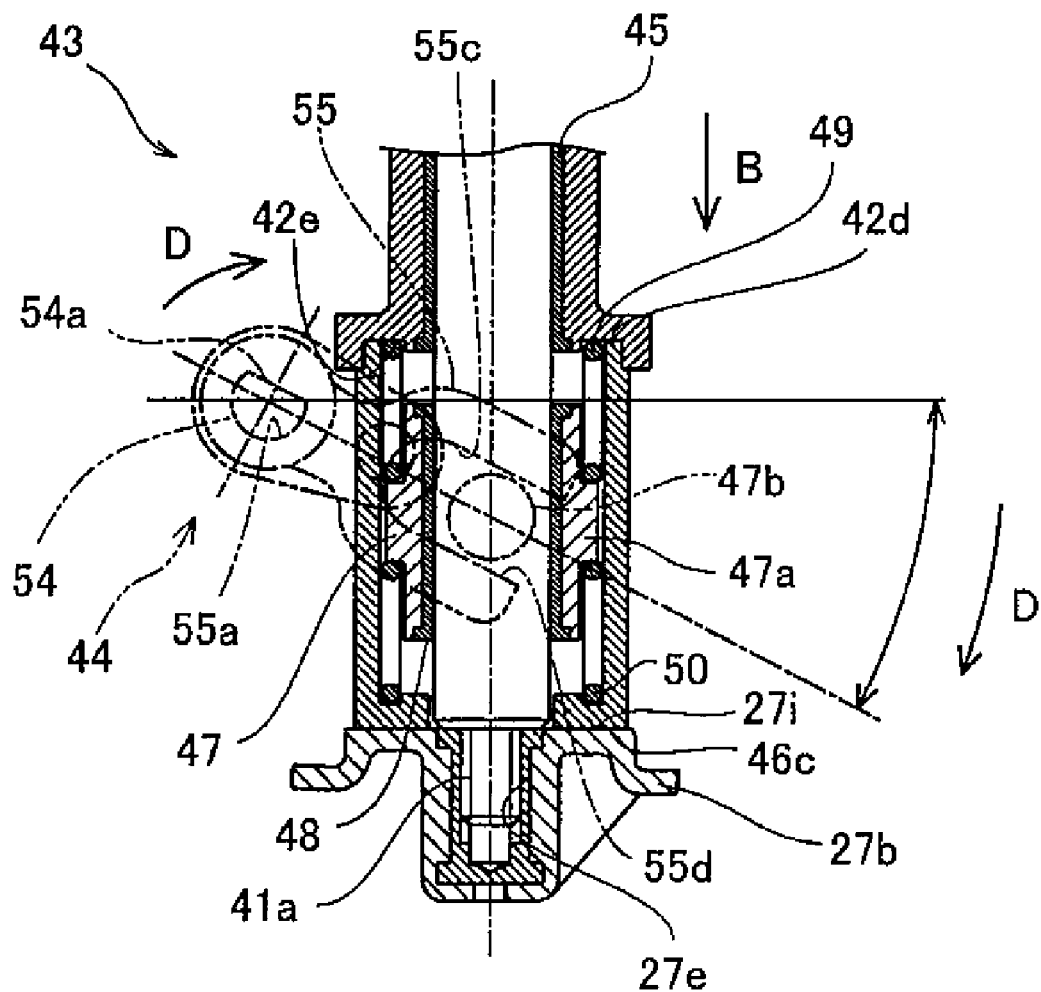
FIG. 15 is a cross sectional view of a moving member of the funnel moving mechanism of FIG. 11.
Figure 16:
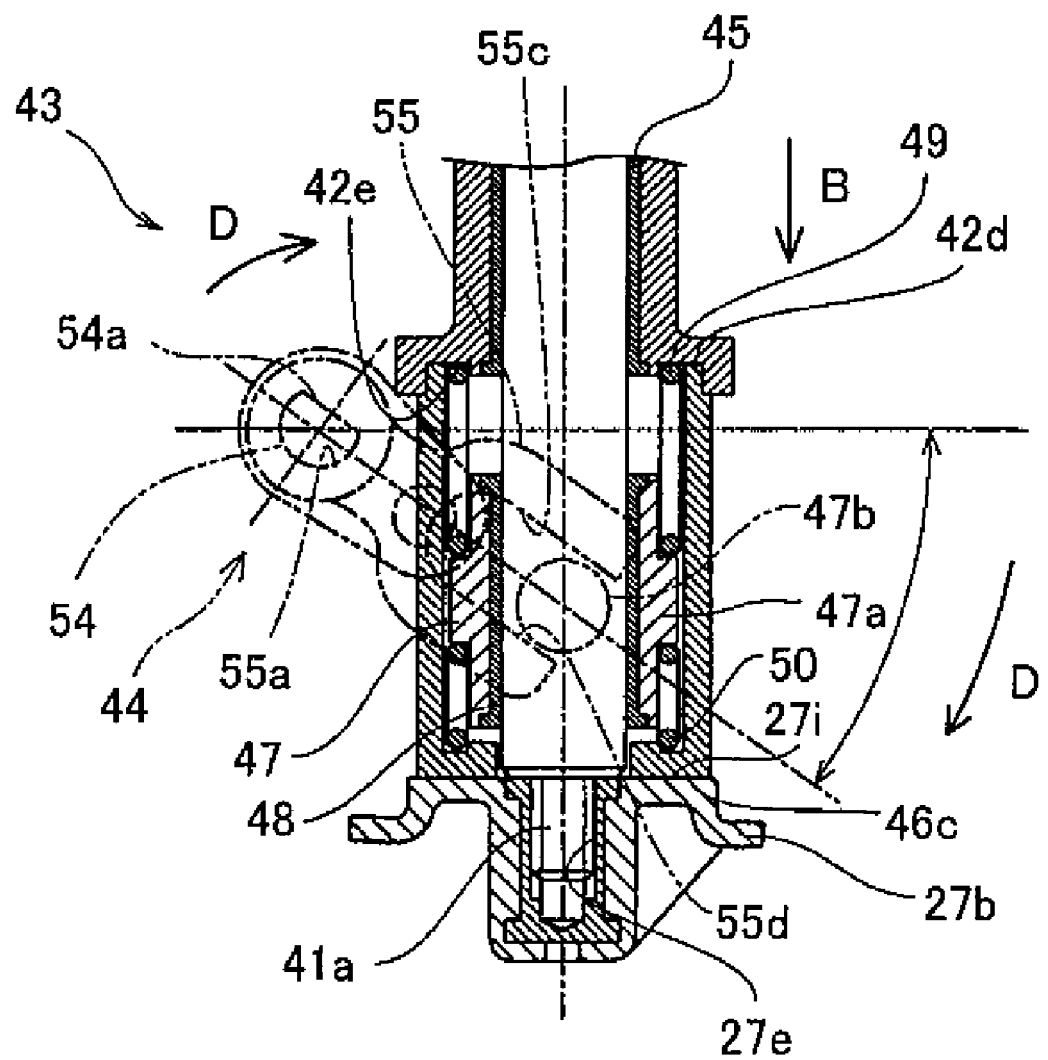
FIG. 16 is a cross sectional view of a moving member of the funnel moving mechanism of FIG. 12.

By constructing moving member 43 and turning member 44 of funnel moving mechanism 32 and motor 56 in this manner, moving funnels 31 are moved in a direction away from stationary funnels 30 when drive shaft 56a and turning member 44 are turned in arrow direction C (FIG. 13). Moving funnels 31 are moved in a direction toward stationary funnels 30 when drive shaft 56a and turning member 44 are turned in arrow direction D (FIG. 15).

Upper abutment 42c of funnel holding section 42 abuts against upper stopper portion 27h of upper cleaner box 27a, as shown in FIGS. 9, 10, 13, and 14, when moving funnels 31 reach the separated positions. Also, slide member 47 is moved in arrow direction A and projections 47b push upper spring member 49 in arrow direction A (see FIGS. 13 and 14). Therefore, when upper abutment 42c abuts against upper stopper portion 27h, upper spring member 49 is compressed and drive shaft 56a is further turned to a predetermined angle in the case where drive shaft 56a is not turned to a predetermined angle due to an error in assembling moving member 43 and turning member 44 to motor 56.

On the other hand, lower abutment 46c of part receiving portion 46 abuts against lower stopper portion 27i of lower cleaner box 27b, as shown in FIGS. 11, 12, 15 and 16 after moving funnels 31 reach the abutment positions. Also, slide member 47 is moved in arrow direction B and projections 47b push lower spring member 50 in arrow direction B (see FIGS. 15 and 16). Therefore, when moving funnels 31 reach the abutment positions, lower spring member 50 is compressed and drive shaft 56a is further turned to a predetermined angle in the case where drive shaft 56a is not turned to a predetermined angle due to an error in assembling moving member 43 and turning member 44 to motor 56.

An operation when intake pipes connected to cylinders 17 from cleaner box 27 are switched in length is now described with reference to FIGS. 4-6 and 9-16.

When engine 14 rotates at high speed, the intake pipes are shortened in order to easily get a pulsation effect. That is, when engine 14 rotates at high speed, moving funnels 31 are moved to the separated positions.

Figure 9:
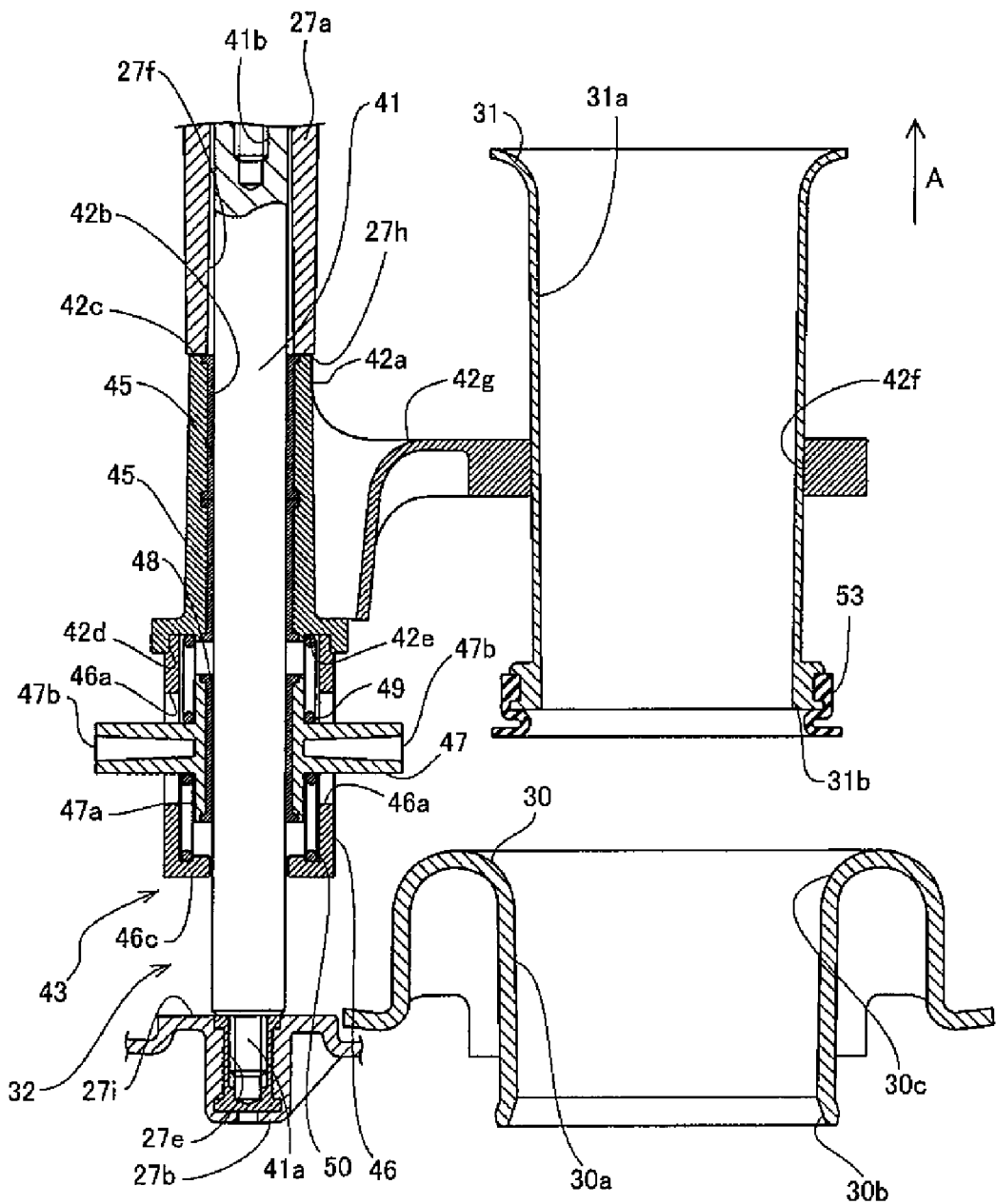
FIG. 9 is a cross sectional view showing a state in which the moving funnels of the motorcycle of FIG. 1 are moved to separated positions.
Figure 10:
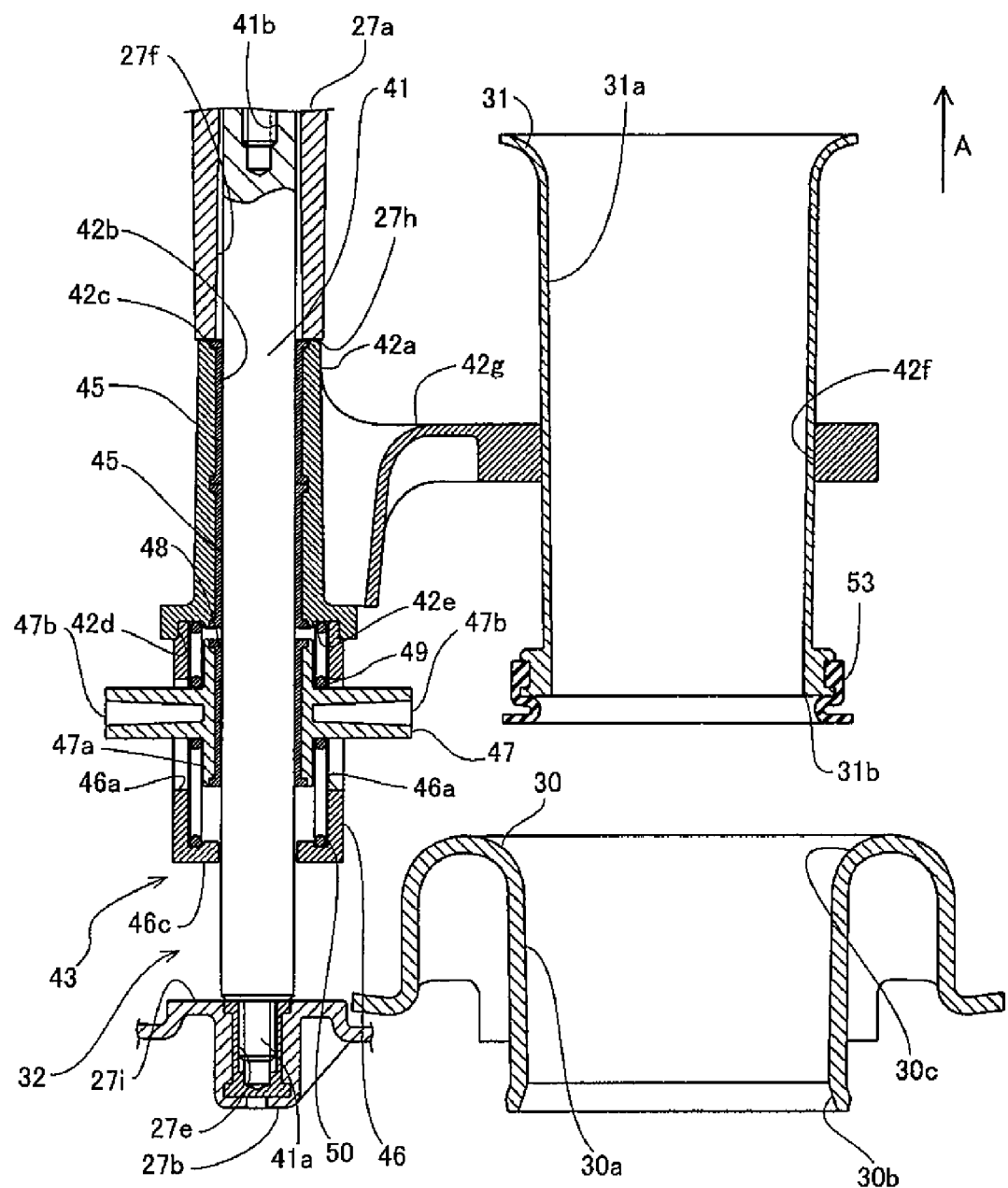
FIG. 10 is a cross sectional view showing a state in which the moving funnels of the motorcycle of FIG. 1 are moved to separated positions.

Specifically, motor 56 turns turning member 44 of funnel moving mechanism 32 in arrow direction C, whereby slide member 47 is moved along spindle 41 in arrow direction A (FIG. 13). Thereby, bias in arrow direction A is generated on upper spring member 49 whereby moving member 43 and funnel holding section 42 are moved straight in arrow direction A (along spindle 41). As shown in FIG. 9, upper abutment 42c of funnel holding section 42 abuts against upper stopper portion 27h, whereby moving funnels 31 are moved to the separated positions. As shown in FIG. 10, turning member 44 is further turned in arrow direction C, whereby upper spring member 49 is compressed and projections 47b are pushed up slide surfaces 55d. Drive shaft 56a is turned to a predetermined angle in arrow direction C (see FIG. 14).

Thereby, moving funnels 31 are moved to the separated positions, in a state in which openings 31b of moving funnels 31 are held in parallel to openings 30c of stationary funnels 30. Consequently, when engine 14 rotates at high speed, intake pipes are shortened since they are constituted by stationary funnels 30, throttle bodies 19 and intake ports 18a (see FIG. 4). Intake efficiency is thereby improved since the pressure wave of high pressure is liable to reach openings of intake ports 18a toward cylinders 17 when intake valves 20a are opened.

When engine 14 rotates at low speed, the intake pipes are lengthened in order to easily get a pulsation effect. That is, when engine 14 rotates at low speed, moving funnels 31 are moved to the abutment positions.

Figure 11:
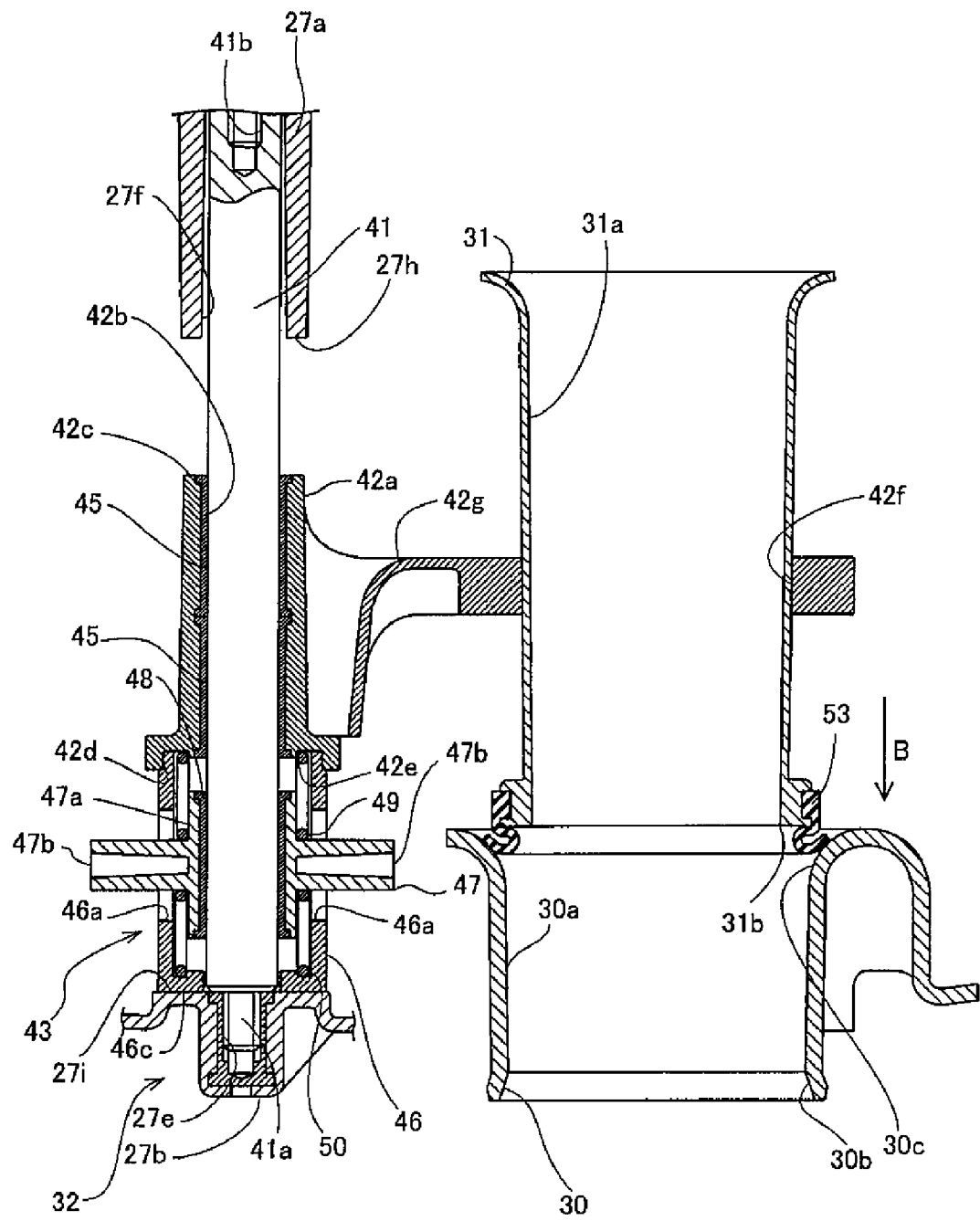
FIG. 11 is a cross sectional view showing a state in which the moving funnels of the motorcycle of FIG. 1 are moved to abutment positions.
Figure 12:
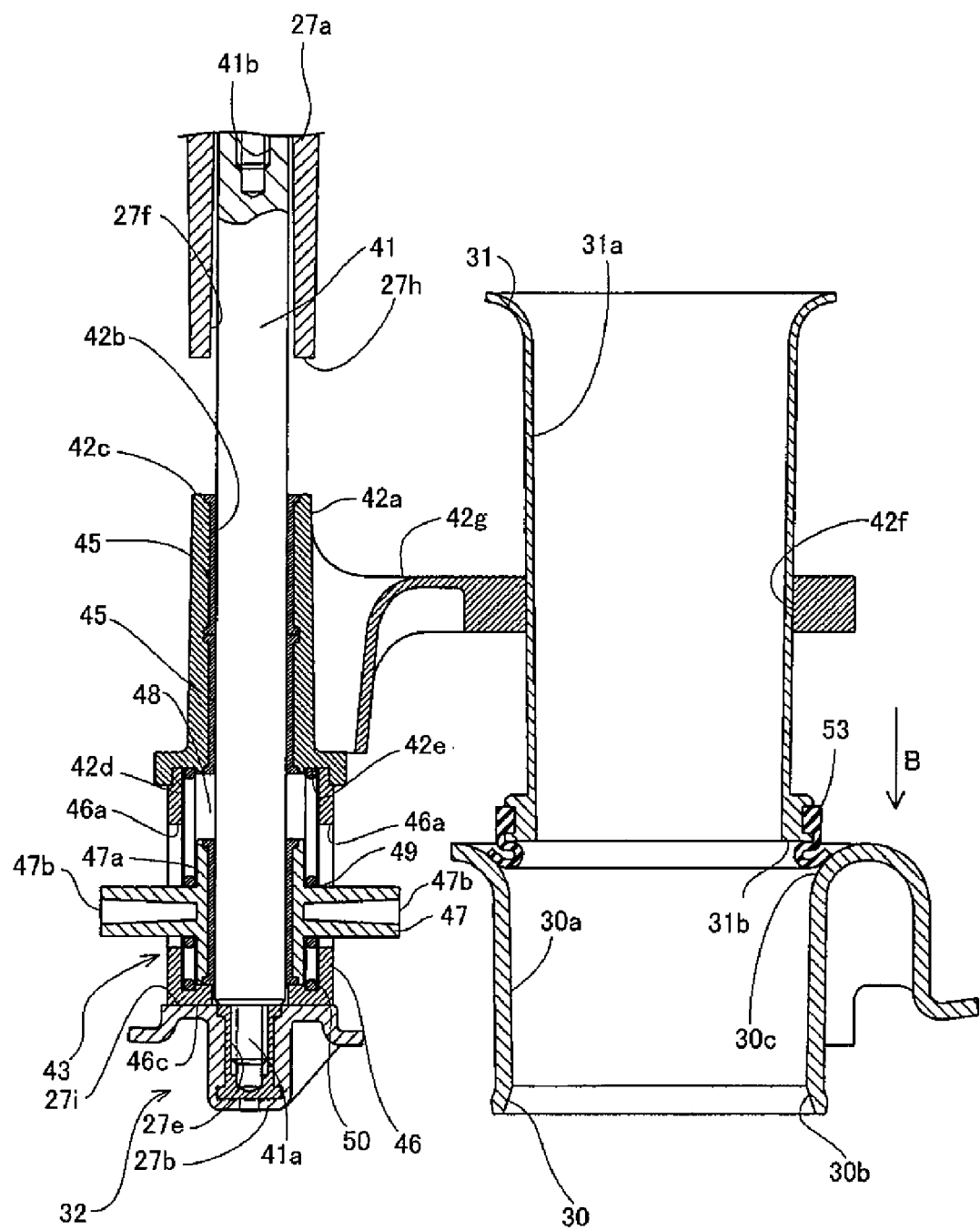
FIG. 12 is a cross sectional view showing a state in which the moving funnels of the motorcycle of FIG. 1 are moved to abutment positions.

Specifically, motor 56 turns turning member 44 of funnel moving mechanism 32 in arrow direction D, whereby slide member 47 is moved along spindle 41 in arrow direction B (see FIG. 15). Thereby, bias in arrow direction B is generated on upper spring member 49, whereby moving member 43 and funnel holding section 42 are moved straight in arrow direction B (along spindle 41). As shown in FIG. 11, openings 31b of moving funnels 31 abut against openings 30c of stationary funnels 30 when moving funnels 31 are moved to the abutment positions. When turning member 44 is further turned in arrow direction D, lower spring member 50 is compressed and projections 47b are pushed down by slide surfaces 55c. Drive shaft 56a is turned to a predetermined angle in arrow direction D (see FIG. 16).

Thereby, moving funnels 31 are moved to the abutment positions, in a state in which openings 31b of moving funnels 31 are held in parallel to openings 30c of stationary funnels 30. Consequently, when engine 14 rotates at high speed, the intake pipes are lengthened since they are constituted by moving funnels 31, stationary funnels 30, throttle bodies 19 and intake ports 18a (see FIG. 4). Intake efficiency is thereby improved since the pressure wave of high pressure is liable to reach openings of intake ports 18a toward cylinders 17 when intake valves 20a are opened.

According to the embodiment, moving funnels 31 move straight between separated positions, in which openings 31b of moving funnels 31 are separated from openings 30c of stationary funnels 30, and abutment positions, in which openings 31b of moving funnels 31 abut against openings 30c of stationary funnels 30, whereby flow of air passing through moving funnels 31 and drawn by stationary funnels 30 is made straight even when openings 31b of moving funnels 31 are separated from openings 30c of stationary funnels 30, so that flow of air is not obstructed. Consequently, intake efficiency is not decreased when moving funnels 31 are separated from stationary funnels 30. Also, a direction in which motor 56 and turning member 44 are arranged, intersects a predetermined direction (arrow directions A and B) in which moving funnels 31 move, whereby motor 56 is not arranged on a straight line in the predetermined direction in which moving funnels 31 move straight, so that increase of size is inhibited in a direction (arrow directions A and B) in which moving funnels 31 move straight.

Also, according to the embodiment, motor 56 can be arranged in a position distant from air filter section 28 by arranging air filter section 28 on an opposite side to a side (a side in the direction of arrow FWD) of cleaner box 27, on which motor 56 is arranged, it is possible to form a space, through which air passes, in a region surrounding air filter section 28. Thereby, flow of air in the region surrounding air filter section 28 is not obstructed, so that flow of air into cleaner box 27 from air filter section 28 is not obstructed.

Also, according to the embodiment, by arranging motor 56, cleaner box 27, and air filter section 28 straight in a longitudinal direction of motorcycle 1, the vehicle width is not too large in a direction perpendicular to a travel direction.

Also, according to the embodiment, moving member 43 moving along spindle 41 in the direction (arrow directions A and B) in which spindle 41 extends, together with funnel holding section 42, are provided on funnel moving mechanism 32, and lever members 55 supporting moving member 43 movably in the direction in which spindle 41 extends, are provided on turning member 44, whereby rotational motion of drive shaft 56a can be converted by turning member 44 and spindle 41 driven by motor 56 into linear motion, in which moving member 43 is moved straight, so that moving member 43 can be readily moved straight along spindle 41. Thereby, as moving member 43 is moved, funnel holding section 42 can readily be moved straight.

Also, according to the embodiment, air passages 31a of moving funnels 31, air passages 30a of stationary funnels 30, and air passages 19a of throttle bodies 19, are formed and connected to be substantially straight, whereby flow of air passing to intake ports 18a of engine 14 from moving funnels 31 and stationary funnels 30 can be made straight, so that the air is not increased in flow resistance and a decrease in intake efficiency is inhibited.

It should be understood that the embodiment disclosed herein is exemplary in all respects and not limitative. The scope of the invention is not limited by the descriptions of the embodiment and includes all changes within the scope of the claims.

For example, while a motorcycle has been described as an example of a vehicle provided with a funnel, the invention is not limited thereto and is also applicable to other vehicles such as automobiles, three-wheelers, ATVs (All Terrain Vehicles), etc.

Also, while a motor arranged in a travel direction of the motorcycle and an air filter section arranged on an opposite side to the travel direction of the motorcycle have been described, the invention is not limited thereto and a motor may be provided on an opposite side to the travel direction of the motorcycle and the air filter section may be arranged in the travel direction of the motorcycle.

Also, while a four-cylinder engine has been described, the invention is not limited thereto and is applicable to vehicles with other multi-cylinder engines and vehicles with a single-cylinder engine.

Also, while an intake duct has been described as covering a duct section, the invention is not limited thereto and the intake duct may be connected to the duct section.

Also, while a stationary funnel has been described as integral with a lower cleaner box, the invention is not limited thereto and the stationary funnel may be formed separately from the lower cleaner box.

Also, while moving funnels and the funnel holding section have been described as separate parts, the invention is not limited thereto and the funnel holding section and moving funnel may be molded integrally.

Also, while the drive shaft of the motor and the turning shaft of the turning member have been described as fixed by a connection, the drive shaft and turning shaft may also be fixed by a coupling or the like.

Also, while a flat portion has been described as inhibiting the lever member of the turning member from idling relative to the turning shaft, the invention is not limited thereto and a plurality of projections (portions subjected to knurling) may be provided on the turning shaft.

The invention claimed is:

1. A vehicle comprising:
an engine having an intake port;
at least one stationary funnel through which air is led to the intake port;
at least one moving funnel arranged movably on an intake side of the stationary funnel and cooperating with the at least one stationary funnel to lead air to the intake port;
a funnel moving mechanism including a turning member for movement of the at least one moving funnel; and
a drive source for driving the turning member of the funnel moving mechanism, wherein the at least one moving funnel is moved straight in a predetermined direction between a first position in which an opening of the at least one moving funnel is separated from an opening of the at least one stationary funnel, and a second position in which the opening of the at least one moving funnel abuts against the opening of the at least one stationary funnel, and
a direction in which the drive source and the turning member are arranged, intersects a predetermined direction in which the at least one moving funnel is moved;
wherein the at least one stationary funnel and the at least one moving funnel are provided in plural, the funnel moving mechanism includes a funnel holding section that holds the plural moving funnels, and the funnel holding section is moved straight in the predetermined direction whereby the plural moving funnels are moved straight between the first position and the second position; and
wherein the funnel moving mechanism further includes a spindle extending straight in a direction in which an air passage through which air from the at least one stationary funnel passes extends, and the funnel holding section is moved along the spindle in a direction in which the spindle extends.

2. The vehicle according to claim 1, further comprising:
a case section, in which the at least one stationary funnel, the at least one moving funnel, and the funnel moving mechanism are arranged; and an air filter section for purification of air flowing into the case section, wherein the air filter section is arranged on an opposite side to a side of the case section on which the drive source is arranged.

3. The vehicle according to claim 2, wherein the drive source, the case section, and the air filter section are arranged straight in a longitudinal direction of the vehicle.

4. The vehicle according to claim 3, further comprising
a duct section having air flowing into the case section through the air filter section, wherein the air filter section and the duct section are arranged rearwardly of the case section in a travel direction, and the drive source is arranged forwardly of the case section in the travel direction.

5. The vehicle according to claim 4, further comprising intake ducts through which air enters from outside the vehicle, wherein the intake ducts are provided laterally of the case section in the travel direction to have an air flowing into the duct section.

6. The vehicle according to claim 5, wherein the intake ducts are provided on left and right sides of the case section in the travel direction.

7. The vehicle according to claim 2, wherein the drive source is arranged outside the case section.

8. The vehicle according to claim 7, wherein the drive source includes a drive shaft connected to the funnel moving mechanism, and a hole, into which the drive shaft is inserted is provided on a side of the case section on which the drive source is arranged.

9. The vehicle according to claim 8, further comprising a sealing member provided between the drive shaft and the hole.

10. The vehicle according to claim 1, wherein the drive source includes a drive shaft connected to the turning member, and the drive shaft extends in a direction intersecting the predetermined direction in which the moving funnel is moved.

11. The vehicle according to claim 10, wherein the turning member is connected coaxially to the drive shaft.

12. The vehicle according to claim 1, wherein the funnel moving mechanism further includes a moving member moving along the spindle in a direction in which the spindle extends together with the funnel holding section, and the turning member includes a lever member supporting the moving member movably in the direction in which the spindle extends.

13. The vehicle according to claim 1, further comprising:
a throttle body arranged between an intake port of the engine and an opening of the stationary funnel toward the engine,
wherein an air passage of the moving funnel, an air passage of the stationary funnel, and an air passage of the throttle body are formed and connected substantially straight.

14. The vehicle according to claim 1, wherein the spindle and the turning member intersect each other as viewed from laterally of the vehicle.

* * * * *